Figure 6:
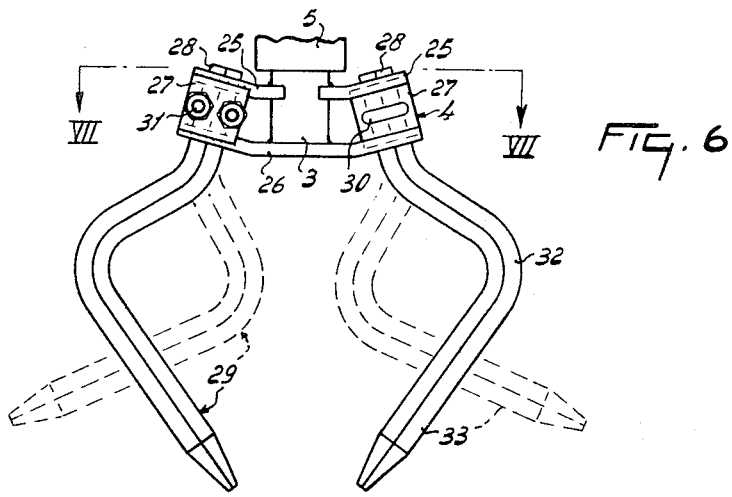

United States Patent [19]
Van Der Lely et al.

[11] 3,783,948
[45] Jan. 8, 1974

[54] CULTIVATORS

[76] Inventors: Ary Van Der Lely, Maasland; Cornelis Johannes Gerardus Bom, Rozenburg, both of Netherlands

[22] Filed: Sept. 13, 1971

[21] Appl. No.: 180,125

Related U.S. Application Data

[63] Continuation of Ser. No. 817,110, Apr. 17, 1969, abandoned.

[30] Foreign Application priority data
Apr. 17, 1968    Netherlands ................ 6805358

[52] U.S. Cl. .................................... 172/49, 172/59, 172/522, 172/703
[51] Int. Cl. .................................... A01b 33/00
[58] Field of Search .................... 172/47–49, 172/57, 59, 110–111, 52, 54, 63, 72, 78, 89, 169, 522, 523, 526, 618–620, 702, 703, 735, 46

References Cited
UNITED STATES PATENTS

| | | | |
|---|---|---|---|
| 3,521,712 | 7/1970 | Vander Lely et al | 172/53 X |
| 2,034,779 | 3/1936 | Storey | 172/59 |
| 2,791,953 | 5/1957 | Erickson et al | 172/111 X |
| 2,983,322 | 5/1961 | Heeren | 172/59 X |
| 3,367,425 | 2/1968 | Heeren | 172/59 X |
| 3,111,917 | 11/1963 | Dawrs | 172/49 X |
| 3,138,208 | 6/1964 | Simms | 172/111 X |
| 1,450,503 | 4/1923 | Keller | 172/63 |
| 3,091,044 | 5/1963 | Penote et al | 172/735 X |
| 3,667,551 | 6/1972 | Van Der Lily | 172/762 |
| 3,616,862 | 11/1971 | Van Der Lily | 172/47 |
| 605,086 | 6/1898 | Darby | 172/49 |
| 2,545,173 | 3/1951 | Shaw | 172/49 |
| 2,582,364 | 1/1952 | Tice | 172/49 |
| 3,115,190 | 12/1963 | Listiak | 172/49 |
| 75,310 | 3/1868 | Standish | 172/59 |
| 339,835 | 4/1886 | Barley | 172/618 |
| 227,445 | 5/1880 | Prindle | 172/702 |
| 282,223 | 7/1883 | Reiner | 172/702 |
| 349,967 | 9/1886 | Wolgamuth | 172/735 |
| 377,359 | 1/1888 | Harwood et al | 172/703 |
| 2,951,547 | 9/1960 | Lawrence | 172/523 |
| 1,729,094 | 9/1929 | Baldwin | 172/526 |

FOREIGN PATENTS OR APPLICATIONS

| | | | |
|---|---|---|---|
| 447,693 | 3/1968 | Switzerland | 172/111 |
| 905,802 | 7/1949 | Germany | 172/49 |
| 1,015,326 | 9/1952 | France | 172/47 |
| 759,116 | 10/1956 | Great Britain | 172/47 |
| 415,320 | 8/1934 | Great Britain | 172/49 |
| 989,461 | 4/1965 | Great Britain | 172/111 |
| 1,381,659 | 11/1964 | France | 172/111 |
| 77,205 | 7/1917 | Switzerland | 172/49 |
| 229,073 | 1/1963 | Austria | 172/59 |
| 619,713 | 3/1949 | Great Britain | 172/47 |

*Primary Examiner*—Robert E. Pulfrey
*Assistant Examiner*—Eugene H. Eickholt
*Attorney*—Mason et al.

[57]    ABSTRACT

A cultivator with a frame that supports a plurality of side-by-side rotatable members having spaced-apart tines that crumble the soil during operation. The tines are held by a support in a vareity of positions so that the soil working portions are changed depending on the amount of soil working desired. A trailing soil-smoothing member is attached to the rear of the cultivator.

6 Claims, 11 Drawing Figures

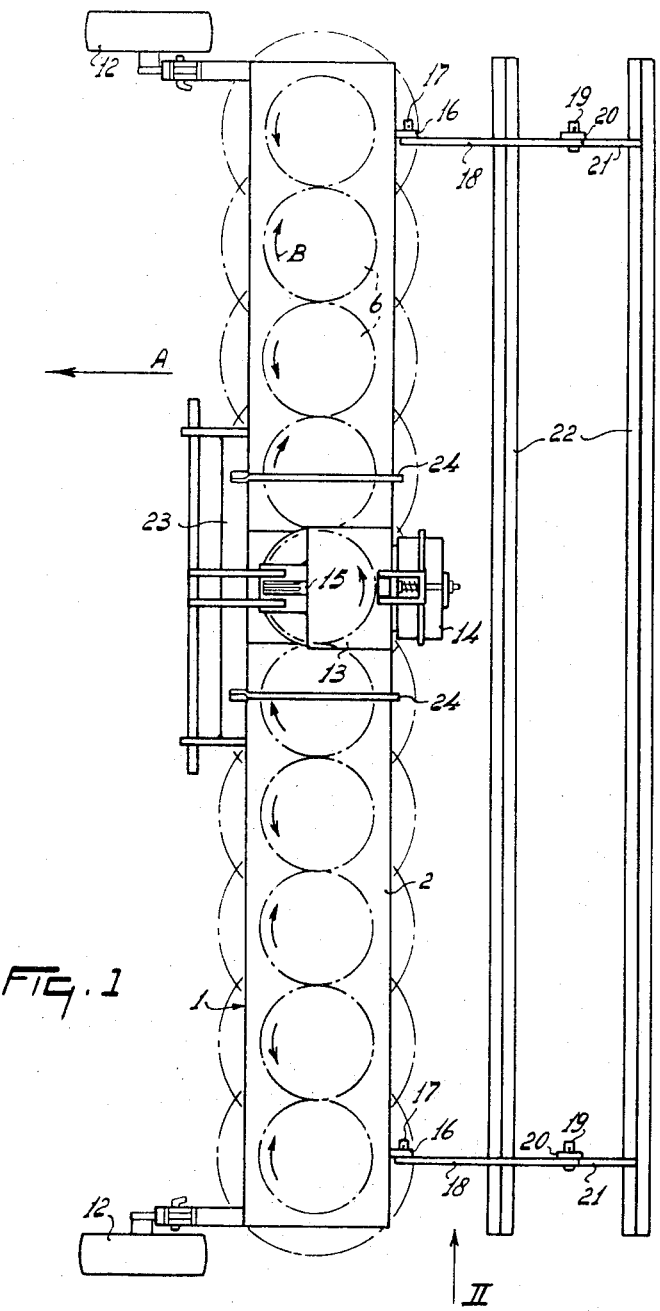

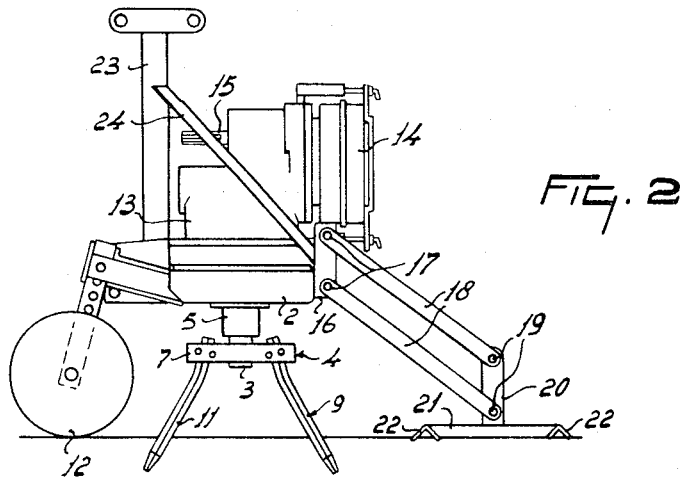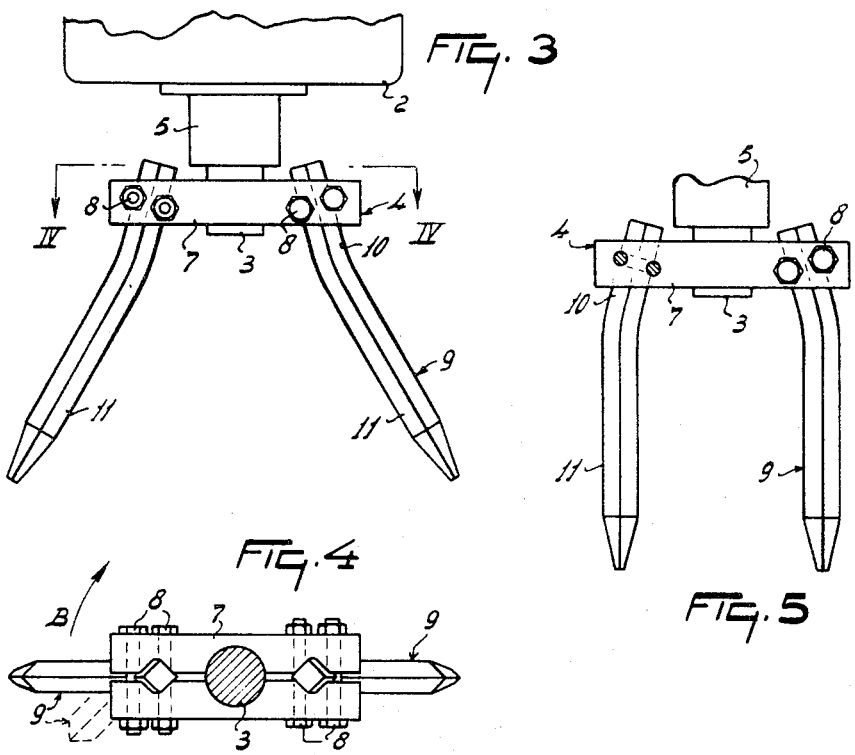

INVENTORS
ARY VAN DER LELY
CORNELIS JOHANNES GERARDUS BOM by Mason, Mason & Albright
Attorneys

CULTIVATORS

This is a continuation of application Ser. No. 817,110, filed Apr. 17, 1969, now abandoned.

According to the invention, there is provided a cultivator of the kind set forth, wherein at least 10 soil cultivating members are mounted in neighbouring side-by-side relationship, each member having tines that are, or can be, arranged so that their soil-working portions trail with respect to the intended direction of rotation of that member.

Figure 7:
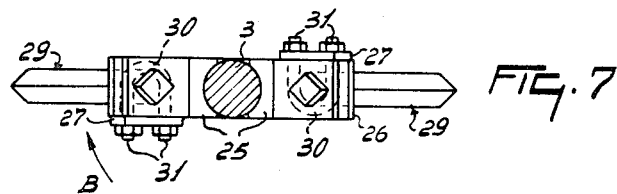
Figures 8, 9:
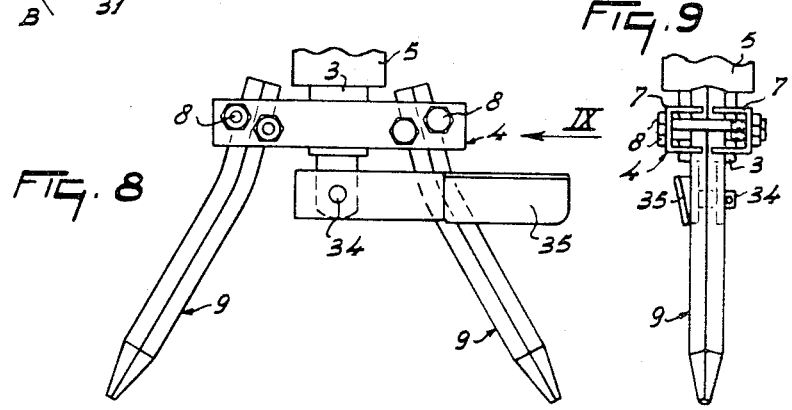
Figure 10:
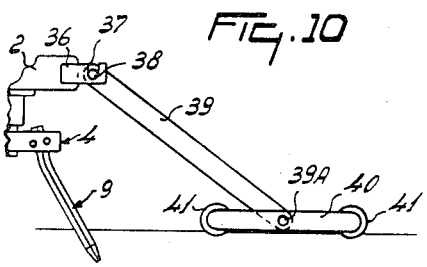
Figure 11:
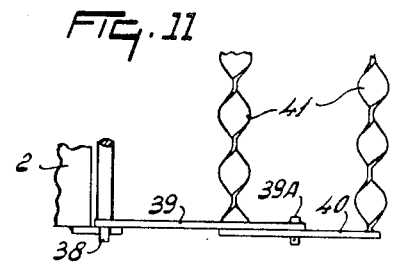

For a better understanding of the invention, and to show how the same may be carried into effect, reference will now be made, by way of example, to the accompanying drawings, in which:

FIG. 1 is a plan view of a soil cultivating implement or cultivator in accordance with the invention, FIG. 2 is a side elevation as seen in the direction indicated by the arrow II of FIG. 1, FIG. 3 is a side elevation, to an enlarged scale, showing the mounting and construction of the tines of the cultivator in greater detail, FIG. 4 is a section taken on the line IV—IV of FIG. 3, FIG. 5 corresponds to FIG. 3 but shows the tines mounted in alternative positions, FIG. 6 again corresponds to FIG. 3 but shows an alternative tine construction and mounting, FIG. 7 is a section taken on the line VII—VII of FIG. 6, FIG. 8 corresponds to FIG. 3 but illustrates a construction in which additional parts are provided, FIG. 9 is a view as seen in the direction indicated by the arrow IX in FIG. 8, FIG. 10 is a side elevation illustrating an alternative form for parts at the rear of the cultivating implement or cultivator, and FIG. 11 is a partial plan view corresponding to FIG. 10.

The cultivating implement or cultivator which is shown in FIGS. 1 to 5 of the drawings has a frame 1 which is afforded principally by a hollow beam 2, of substantially rectangular cross-section, that extends substantially perpendicular to the intended direction of operative travel of the cultivator which is indicated by an arrow A in FIG. 1 of the drawings. 10 soil cultivating members that are generally indicated by the reference 4 are rotatably mounted in a row beneath the beam 2 with the aid of corresponding upright shafts 3 whose longitudinal axes are preferably vertically disposed. It will be understood that, although the illustrated cultivator has 10 soil cultivating members 4, a greater or lesser number thereof may be provided as desired. Each shaft 3 is spaced apart from its neighbour, or each of its neighbours, by a perpendicular distance which is not greater than 30 centimeters and which it is preferred should be about 25 centimeters. Each shaft 3 is rotatably journalled in a corresponding bearing 5 mounted at the bottom of the beam 2 and is provided above said bearing and inside the beam 2 with a corresponding spur-toothed pinion 6. As can be seen in FIG. 1 of the drawings, the 10 spur-toothed pinions 6 lie in a row inside the hollow beam 2 with the teeth of each pinion in mesh with those of the pinion or pinions that are next to it.

Each of the soil cultivating members 4 includes two tine supports 7 that are of channel-shaped cross-section (see FIG. 9). The two tine supports are arranged at the lowermost end of the corresponding shaft 3 in such a way that approximately semi-circular recesses formed midway along the lengths of the limbs of said supports embrace opposite sides of the shaft 3 (see FIGS. 4 and 9). Approximately V-shaped notches or recesses are also formed in the limbs of the tine supports 7 towards opposite ends of said limbs and two soil-working tines 9 that are of square cross-section have their upper ends 10 lodged in said recesses, two pairs of transverse bolts 8 being entered through the bases of both supports 7 at opposite sides of each tine 9 in such a way that the shanks of said bolts pass through grooves formed in the tines so as to prevent axial displacement of the latter. Rotational displacement of the tines 9 is, of course, prevented by the engagement thereof with the approximately V-shaped recesses in the limbs of the tine supports 7. Tightening of the bolts 8 also serves to clamp the tine supports 7 firmly to the lower end of the corresponding shaft 3. As an alternative, one of the tine supports 7 may be rigidly secured to the lowermost end of the corresponding shaft 3 while the other support 7 is fastened to the one just mentioned by the bolts 8.

The fastening portions of the tines 9 that are afforded by the upper ends 10 thereof merge, immediately beneath the lower limbs of the supports 7, into rectilinear soil-working portions 11 the lowermost ends of which are pointed. The upper ends 10 and the soil-working portions 11 are both straight and are inclined to one another in such a way that an angle of not less than about 165° is enclosed between their respective longitudinal axes. It will be apparent that the square cross-section tines 9 can be arranged in any one of four different positions relative to the supports 7, two of these positions being shown in FIGS. 3 and 5 of the drawings while a third position, in which the tines 9 are trailing with respect to the intended direction of rotation B of the corresponding shaft 3, is shown in broken lines in FIG. 4 in respect of one of the tines 9. It will be realised that a fourth position can be adopted in which the soil-working portions 11 of the tines 9 project forwardly relative to the direction B rather than trail as shown in broken lines in FIG. 4.

The soil cultivating members 4 are arranged in such a way that their tines 9 normally work the soil in overlapping strips, the supports 7 of the neighbouring members 4 being angularly offset from one another so as to prevent the tines 9 of neighbouring members 4 from fouling one another during rotation. The circles traced by the tips of the tines 9 when arranged as shown in FIGS. 2 and 3 of the drawings are indicated by broken-line circles in FIG. 1 of the drawings. The opposite ends of the beam 2 are provided with ground wheels 12 that are vertically adjustable in a simple manner with the aid of parts which can be seen in outline in FIGS. 1 and 2 of the drawings. One of the central two of the shafts 3 is extended upwardly into a gear box 13 and carries a bevel pinion whose teeth are in mesh with those of a further bevel pinion mounted on a shaft extending substantially parallel to the direction A. The gear box 13 also includes a rotary input shaft 15 that extends substantially parallel to the direction A and whose leading splined or otherwise keyed end projects forwardly from said gear box 13. The rearmost ends of the shaft 15 and the other relatively parallel shaft (not visible in the drawings) that have just been mentioned project from the back of the gear box 13 and can be connected with one another by way of a change-speed gear 14 which is releasably clamped to the gear box 13 and which can occupy any one of four different positions relative to that gear box, each such position providing a different transmission ration between the input shaft 15 and the shafts 3 by which the soil cultivating members 4 are driven. Further details of the construction of the change-speed gear 14 are not required for an understanding of the present invention. The forwardly projecting end of the rotary input shaft 15 is, of course, intended to be placed in driven connection with the power take-off shaft of a tractor or other vehicle with the aid of an intermediate telescopic transmission shaft (not shown) of known construction having universal joints at its opposite ends.

Vertical strips 16 project rearwardly from the beam 2 towards opposite ends of the latter and upper and lower arms 18 extend between said strips 16 and substantially vertical supports 20 that project upwardly from corresponding horizontal strips 21, said strips 21 extend parallel to the direction A. As can be seen best in FIG. 2 of the drawings, the leading ends of the arms 18 are turnably connected to the strips 16 by upper and lower horizontal pivot pins 17 while the rearmost ends of said arms are similarly connected to the supports 20 by upper and lower horizontal pivot pins 19. The pivot pins 17 and 19 are located at the four corners of a parallelogram so that the horizontal strips 21 can move upwardly and downwardly relative to the frame 1 while maintaining their substantially horizontal disposition. The foremost ends of the two strips 21 are interconnected by a trailing beam 22 and the rearmost ends of the two strips are similarly interconnected by a second trailing beam 22. The trailing beams 22 extend parallel or substantially parallel to one another and each of them has an interverted V-shaped cross-section.

A coupling member 23 of conventional construction is mounted approximately centrally of the front of the beam 2 and can be employed, in known manner, to connect the cultivator to the three-point lifting device or hitch of an agricultural tractor or other vehicle. Strengthening strips 24 interconnect upper regions of the coupling member 23 and the rear of the beam 2. FIGS. 6 and 7 of the drawings show an alternative construction of the tines and their mountings. In this embodiment, strips 25 project from opposite sides of the shaft 3 just beneath the bearing 5 whilst a further strip 26 is fastened to the bottom of the shaft 3 in such a way that opposite end regions thereof are in matching register with the two strips 25. The rearmost edges of the strips 25 and 26 with respect to the direction B are interconnected by vertical plates 27. The strips 25 and 26 are formed with aligned square holes which receive the upper ends 28 of tines 29 that are of square cross-section. When the fastening portions that are afforded by the upper ends 28 of the times 29 are in position in the holes in the strips 25 and 26, U-shaped shackles 30 have their limbs entered through holes formed in the plates 27 in such a way that said shackles engage grooves in the upper ends 28. Upon tightening nuts 31 mounted on the screw-threaded limbs of the shackles 30, the tines 29 are prevented from moving both axially and rotationally relative to the strips 25 and 26.

The upper ends 28 of the tines 29 merge by way of bends 32 into rectilinear soil-working portions 33 whose lowermost ends are pointed. In the positions of the tines 29 that are shown in full lines in FIGS. 6 and 7 of the drawings, the points that have just been mentioned are in substantially vertical alignment with the regions at which the upper ends 28 are secured to the strips 25 and 26. As in the embodiment described with reference to FIGS. 1 to 5 of the drawings, each tine 29 can occupy any one of four different positions with respect to the strips 25 and 26, one alternative position being shown in broken lines in FIG. 6 of the drawings and it being evident that two further alternative positions are possible in which the soil-work port ons 33 of the tines either trail, or project forwardly, with respect to the direction B.

FIGS. 8 and 9 of the drawings show a modification of the tine construction and mounting which have been described with reference to FIGS. 1 to 5 in which modification a soil-smoothing member 35 is pivotally connected by a substantially horizontal pin 34 to a downward extension of the corresponding shaft 3. The member 35 normally extends in a substantially radial direction with respect to the axis of rotation of the corresponding shaft 3. The member 35 cannot turn downwardly to any appreciable extent about the pin 34 due to the fact that the downward extension of the shaft 3 to which the pin 34 is connected is of shouldered formation, the shoulder being engaged by the upper edge of the soil-smoothing member 35. This construction can be seen in FIGS. 8 and 9 of the drawings. The soil-smoothing member 35 acts to level the soil which is broken up and displaced by the tines 9 during operation of a cultivator to which the corresponding soil cultivating member 4 is fitted.

FIGS. 10 and 11 of the drawings show a construction which can be used as an alternative to the trailing beams 22 that have been described above. In this construction, horizontal strips 36 project rearwardly from the opposite ends of the beam 2, their upper edges being formed with U-shaped recesses 37 in which corresponding pins 38 can be lodged. The pins 38 are interconnected by a member that extends parallel to the beam 2 and arms 39 project downwardly and rearwardly, relative to the direction A, therefrom. The ends of the arms 39 that are remote from the pins 38 are connected by further substantially horizontal pivot pins 39A to support strips 40 that extend substantially horizontally parallel to the direction A. The leading and rearmost ends of the two support strips 40 are interconnected by substantially parallel and substantially horizontally disposed trailing beams 41 each of which takes the form of a spirally wound strip.

In the use of the cultivator which has been described with reference to FIGS. 1 to 5 of the drawings, its coupling member 23 is connected to the three-point lifting device or hitch of an agricultural tractor or other vehicle and the rotary input shaft 15 is placed in driven connection with the power take-off shaft of the same tractor or other vehicle in the manner previously described. As the cultivator is moved over the ground in the direction A, the shafts 3 are rotated in the direction B, or relatively opposite direction, and the tines 9 penetrate into, and displace, the soil. It will be apparent that each soil-working member 4 rotates in a direction which is opposite to that of its neighbour or both its neighbours in the row of 10 such members. The tines 9 can be set in any one of the four different positions which have been described in dependence upon the nature and condition of the soil and the particular result required. If a very fine seed bed is required, the tines 9 are best set in the trailing position which is shown in broken lines in FIG. 4 of the drawings while the position shown in FIGS. 2, 3 and 8 is to be preferred when intensive crumbling of the soil is required. Only moderate crumbling of the soil takes place with the setting of the tines 9 that is shown in FIG. 5 while cultivation of stubble fields and the like is best effected with the position (not illustrated) in which the tines project forwardly with respect to the direction B.

The tines 29 that are shown in FIGS. 6 and 7 of the drawings are particularly useful in intensively crumbling top soil and it will be noted that the points of the soil-working portions 33 are always in approximate axial alignment with the positions at which the upper ends 28 of the tines are secured to the strips 25 and 26 no matter which of the four possible working positions is adopted. The trailing beams 22 and 41 act efficiently to produce a level surface which is particularly desirable when a seed bed is being formed. In both of the constructions which have been described, the beams 22 or 41 can move upwardly and downwardly independently of the soil cultivating members 4. The beams 41 have a relatively large area of contact with the soil surface.

Having thus described my invention, what I claim as new and desire to secure by Letters Patent of the United States is:

1. A cultivator attachment comprising an elongated frame movable over the ground transverse to the direction of travel with a plurality of rotatable soil cultivator members supported in a row along said frame in side-by-side relationship with neighboring cultivator members being rotatable in opposite directions from one another about upwardly extending shafts and alternatively located cultivator members being rotatable in like directions with one another, said shafts being in driving connection with a power input shaft and each of said cultivator members being an elongated, substantially horizontal, tine support having a tine secured adjacent each end thereof, the tines of neighboring cultivator members being positioned to work and cultivate overlapping strips of ground, each of said tines having a fastening portion which is connected to its respective support and an integral substantially straight soil-working portion including a bottom tip substantially inclined to said fastening portion, substantially the entire soil-working portion, with respect to the direction of rotation of its respective support, being located and secured in position to trail at the rear of said fastening portion, the soil-working portions of the tines of alternatively located cultivator members being positioned to extend substantially parallel to one another.

2. A cultivator as claimed in claim 1, wherein the angle enclosed between the longitudinal axis of said fastening portion and said soil-working portion is approximately 15°.

3. A cultivator as claimed in claim 1, wherein said shafts are each secured to a tine support between the fastening portions of the two tines.

4. A cultivator as claimed in claim 1, wherein one side of said frame is connected to vertically adjustable ground engaging means that support the frame.

5. A cultivator as claimed in claim 4, wherein said vertically adjustable ground engaging means is connected to the forward side of said frame and a ground leveling member is pivotally secured to the rear side of said frame.

6. A cultivator attachment comprising an elongated frame movable over the ground transverse to the direction of travel with a plurality of rotatable soil cultivator members supported in a row along said frame in side-by-side relationship, with neighboring cultivator members being rotatable in opposite directions from one another about upwardly extending shafts, and said shafts being in driving connection with a power input shaft, each of said cultivator members being an elongated, substantially horizontal tine support having a tine secured adjacent each end thereof, said tines being positioned to work and cultivate overlapping strips of ground, each of said tines having a fastening portion which is connected to its respective support and an integral straight soil-working portion with a plural-sided cross section which is substantially inclined to said fastening portion, substantially the entire soil-working portion, including the tip thereof, with respect to the direction of rotation of the cultivator member, being secured to trail at the rear of said fastening portion, the soil-working portions of the tines of alternatively located cultivator members extending substantially parallel to one another.

* * * * *